United States Patent [19]

Heikkinen

[11] Patent Number: 5,129,697
[45] Date of Patent: Jul. 14, 1992

[54] MOTOR CONTROLLED, VERTICALLY EXPANDABLE ENCLOSURE FOR PICKUP TRUCK OR TRAILER

[76] Inventor: Verner E. Heikkinen, P.O. Box 908, Vandervoort, Ark. 71972

[21] Appl. No.: 703,622

[22] Filed: May 21, 1991

[51] Int. Cl.$^5$ ............................................. B60P 3/345
[52] U.S. Cl. ........................................ 296/26; 296/165; 296/180.1; 296/35.3; 414/498
[58] Field of Search ............... 296/35.3, 26, 164–165, 296/171–173, 175–176, 180.1; 414/498

[56] References Cited

U.S. PATENT DOCUMENTS

| | | | |
|---|---|---|---|
| 3,021,170 | 2/1962 | Cornelius | 296/164 |
| 3,061,358 | 10/1962 | Lien | 296/26 |
| 3,116,085 | 12/1963 | Uttley | 296/26 |
| 3,145,046 | 8/1964 | Orn et al. | 296/165 X |
| 3,286,414 | 11/1966 | Harrison et al. | 52/66 X |
| 3,363,932 | 1/1968 | Mann | 296/164 |
| 3,490,173 | 1/1970 | Clemens | 49/104 |
| 3,652,119 | 3/1972 | Hall | 296/164 |
| 3,820,833 | 6/1974 | Margetts et al. | 296/164 X |
| 3,966,250 | 6/1976 | Winskas | 296/1.1 |
| 3,981,529 | 9/1976 | Bontrager | 52/66 X |
| 4,220,370 | 9/1980 | Rice | 296/165 |
| 4,261,614 | 4/1981 | Rice | 296/171 |
| 4,328,989 | 5/1982 | Childers | 296/27 |
| 4,496,184 | 1/1985 | Byrd et al. | 296/180.1 X |
| 4,603,901 | 8/1986 | McIntosh | 296/165 |
| 4,810,158 | 3/1989 | Bitzer | 414/498 |

FOREIGN PATENT DOCUMENTS

| | | | |
|---|---|---|---|
| 862619 | 2/1971 | Canada | 296/165 |
| 2127814 | 12/1972 | Fed. Rep. of Germany | 414/498 |
| 3611750 | 10/1987 | Fed. Rep. of Germany | 296/180.1 |
| 3900481 | 7/1989 | Fed. Rep. of Germany | 296/165 |
| 2424388 | 12/1979 | France | 296/171 |

Primary Examiner—Dennis H. Pedder
Attorney, Agent, or Firm—Arthur F. Zobal

[57] ABSTRACT

Telescoping upper and lower units are provided for use on the bed of a vehicle. Rotatable gears are supported on the inside of the lower unit and rack gears are secured to the inside of the upper unit for use for moving the upper unit to upward and downward positions relative to the lower unit. The rear ends of the upper and lower unit have upper and lower doors which are slidably relative to each other and are pivotally coupled to the rear walls of the upper and lower units for pivotal movement about aligned axes for opening and closing upper and lower door openings formed in the upper and lower units respectively. Rollers are provided on the bottom side of the lower unit and which may be moved to downward extending and retracted position for removing and/or installing the apparatus from or onto the bed of the vheicle. A plurality of support posts or legs are secured to the lower unit which are movaable to retracted and supporting positions for supporting the apparatus when removed from the vehicle. A flexible wind shield is coupled to the outside and upper end of the front wall of the upper unit and has magnetic material for removably coupling its lower end to the cab of a vehicle when the lower unit is supported in its lower position.

17 Claims, 9 Drawing Sheets

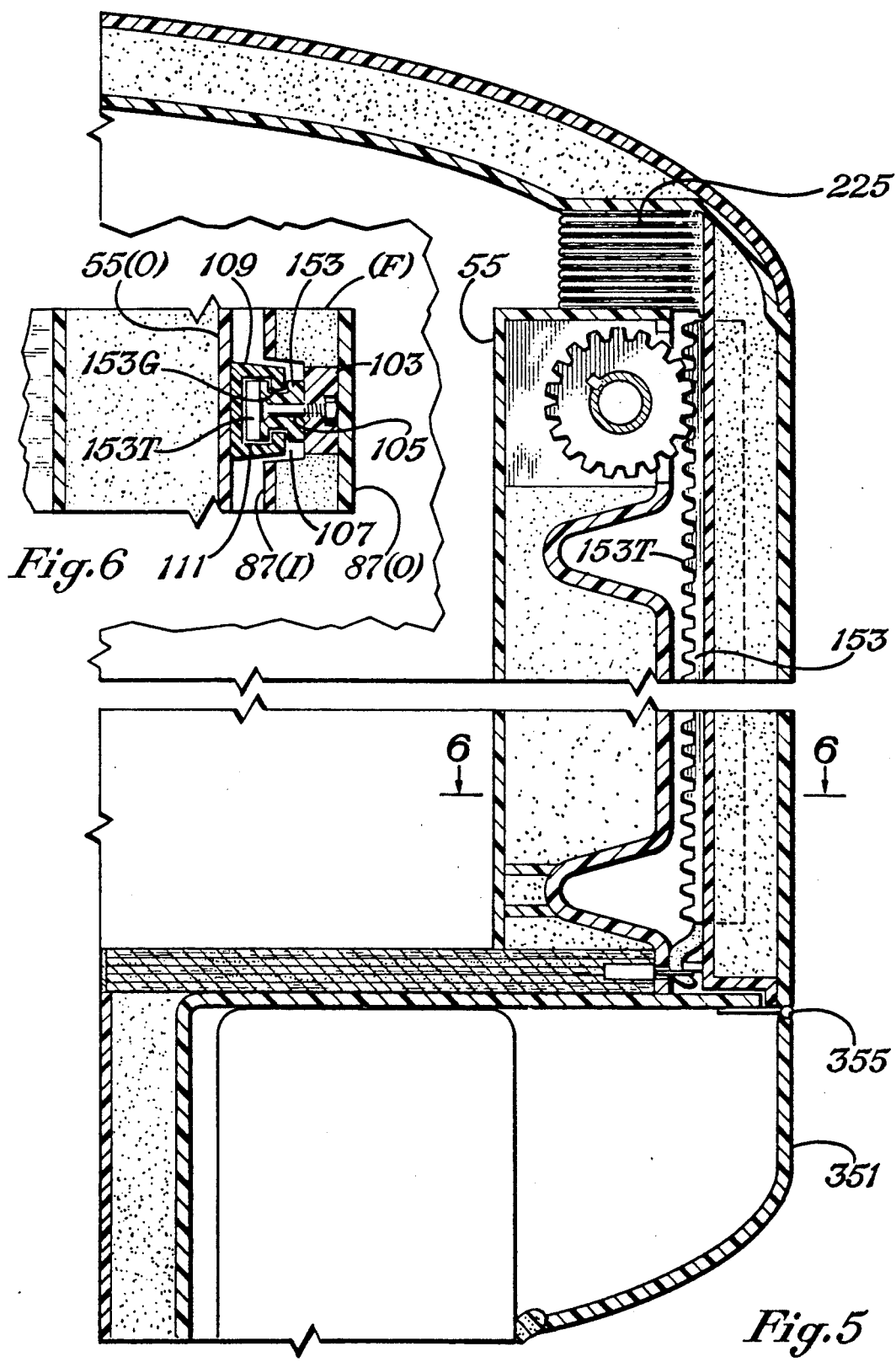

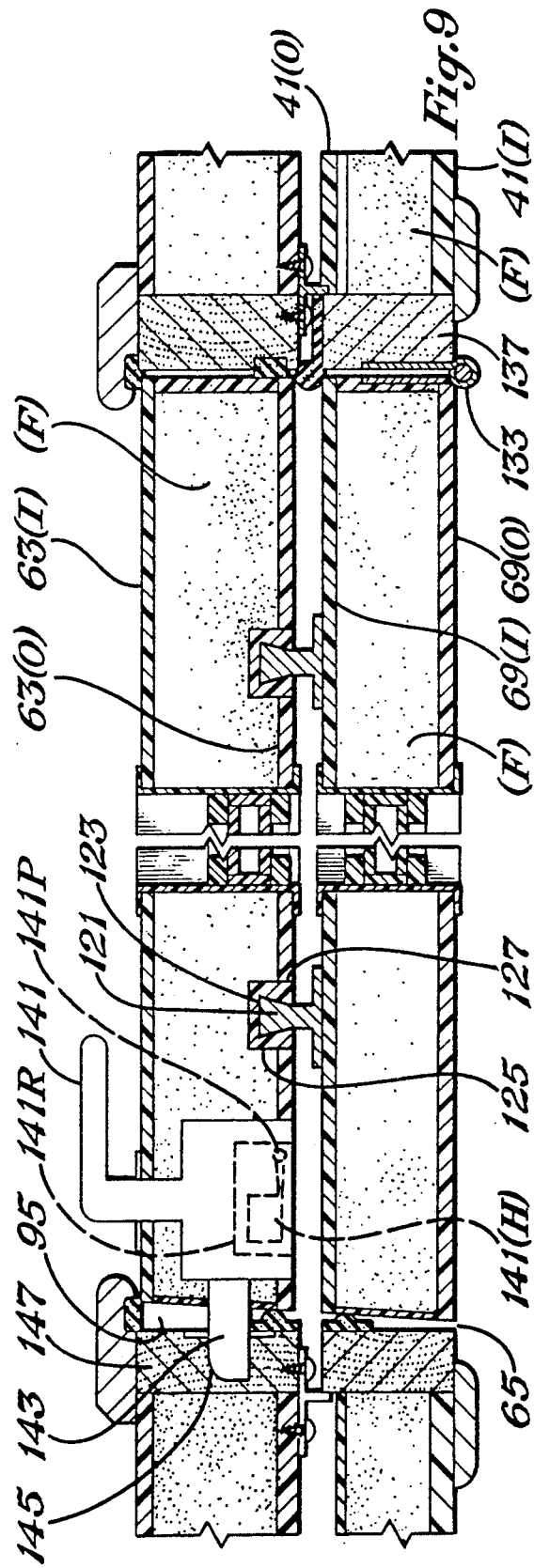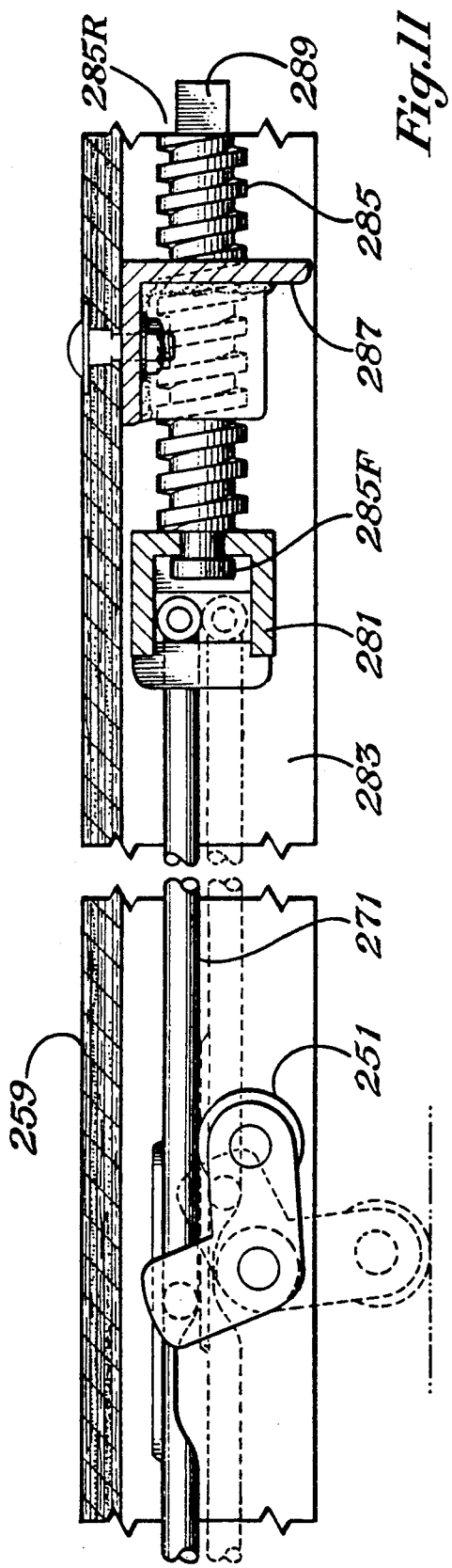

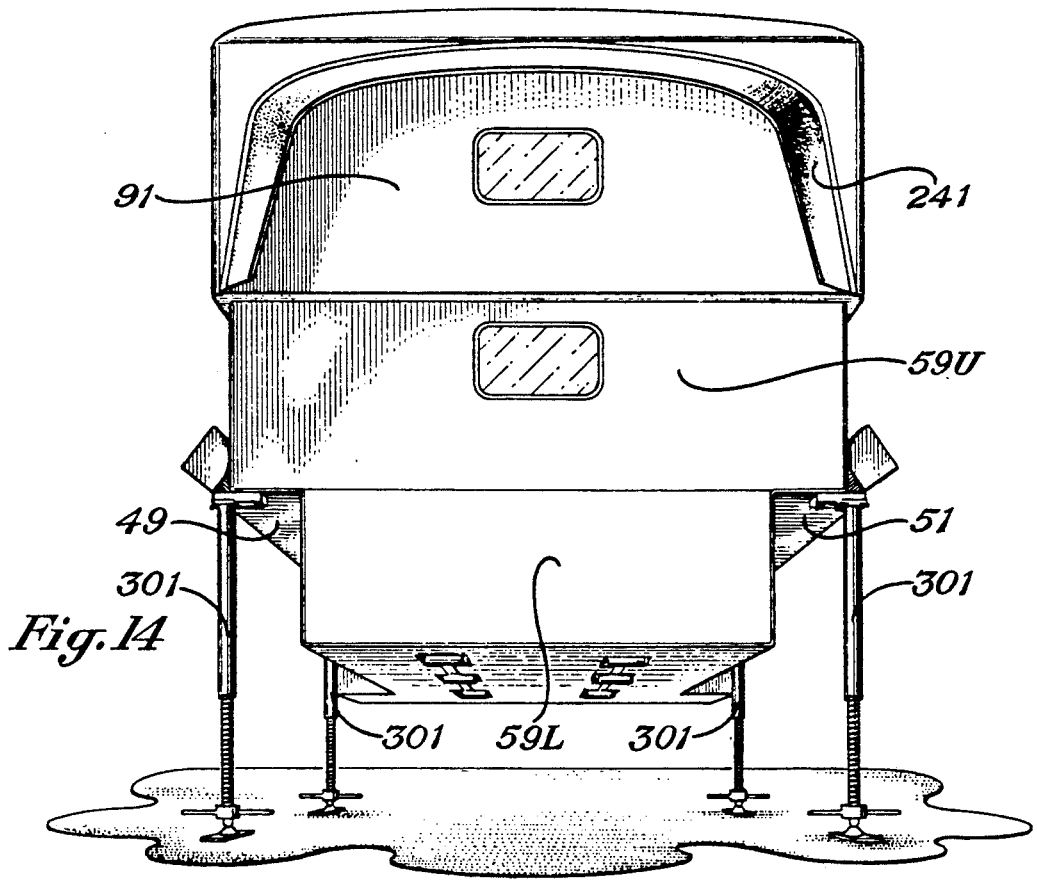
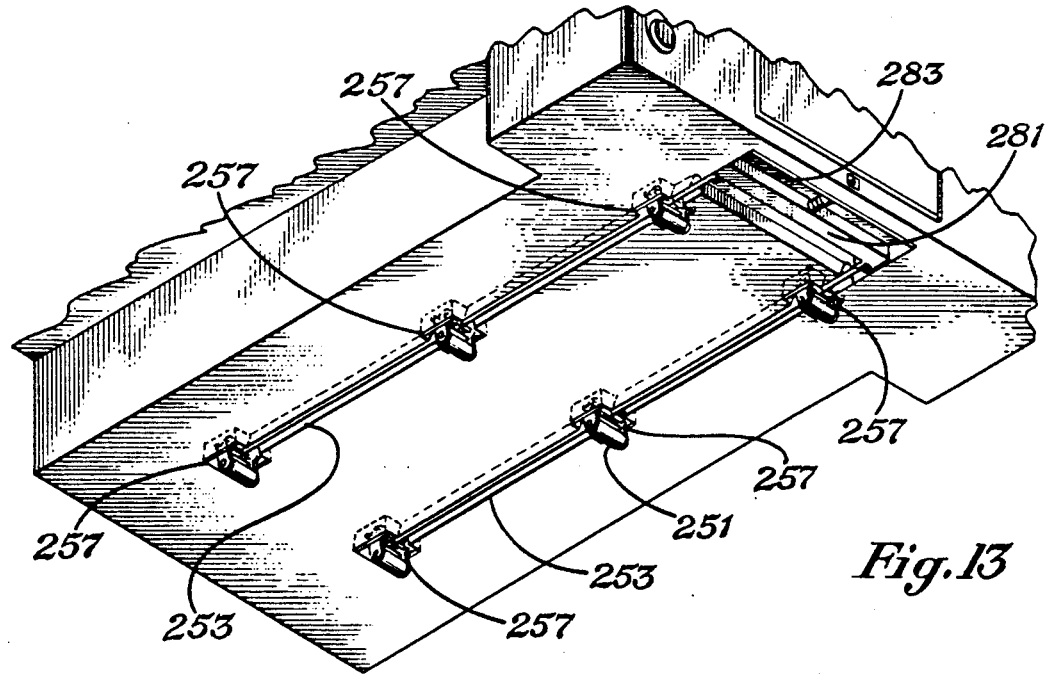

MOTOR CONTROLLED, VERTICALLY EXPANDABLE ENCLOSURE FOR PICKUP TRUCK OR TRAILER

BACKGROUND OF THE INVENTION

1. Field of the Invention

The invention relates to a vertically expandable enclosure which may be used for sleeping purposes, storage, etc., and which is adapted to be supported by the bed of a pickup truck or trailer.

2. Description of the Prior Art

The following U.S. Patents disclose different types of telescoping enclosures, some of which are adapted to be supported on the bed of a pickup truck or other type of vehicle.

| | |
|---|---|
| 3,286,414 | 4,220,370 |
| 3,490,173 | 4,261,614 |
| 3,966,250 | 4,328,989 |
| 3,981,529 | 4,603,901 |

All of the devices of these patents have one or more of the following problems:

1. They are cumbersome to set up for use and require much time and manual activation.
2. The mechanisms have exposed moving gears and parts which are dangerous to the operator/occupant.
3. Many use cables in the mechanism for driving or lifting the enclosures which stretch and need constant adjustment to provide level, safe lifting.
4. Some employ hydraulic cylinders which are expensive, require pumps and are subject to cold weather stalling and leakage.
5. The use of telescoping columns and jack screws that are subject to corrosion, sticking and binding.
6. A contractible door that has a very complex mechanism which requires many parts and is difficult to build and maintain.
7. None of the previous devices have seriously addressed the problems of aerodynamics of a moving unit or the use of structurally formed thermoplastics to obtain lighter weight and strength.

SUMMARY OF THE INVENTION

It is an object of the invention to provide an expandable enclosure for use on the bed of a vehicle which does not have the problems of the prior art as discussed above and which is effective and easy to use on the vehicle and easy to remove from and install on the vehicle.

The apparatus of the invention comprises lower structural unit having a bottom to be supported by the bed of a vehicle, a front wall, two side walls, and a rear wall. Also provided is upper structural unit having a top, a front wall, two side walls, and a rear wall. The lateral inside dimensions of the walls of the upper unit are greater than the lateral outside dimensions of the walls of the lower unit whereby the walls of the upper unit may extend downward from the top and may fit around the walls of the lower unit. Gear means is provided for supporting the walls of the upper unit around the walls of the lower unit and for use for moving the upper unit to upper and lower positions relative to the lower unit. The gears means comprises rack gear means coupled to the inside of the side walls of the upper unit and rotatable gear means supported by the side walls of the lower unit which mesh with the rack gear means such that rotation of the rotatable gear means in one direction moves the upper unit to the upper position and rotation of said rotatable gear means in an opposite direction moves said upper unit to the lower position. Drive means is provided for rotating said rotatable gear mean in either of said first or second directions.

In a further aspect, said gear means comprises at least two rack gears located on the inside of each of the side walls of the upper unit near the front and rear walls thereof and extending in a direction transverse to the lateral dimensions of the side walls. Said rotatable gear means comprises two pairs of rotatable gears supported at upper positions to mesh with said two rack gears of each of said side walls respectively of said upper unit. Shaft means is connected to each pair of rotatable gears. Drive means is supported by said lower unit near the front wall thereof for driving said pairs of rotatable gears together.

In another aspect, upper and lower door openings are formed through the rear walls of the upper and lower units in alignment with each other. Upper and lower door members are pivotably coupled to the rear walls of the upper and lower units respectively about the same pivot axes for opening and closing the upper and lower door openings respectively. Means is provided for slidably coupling the upper and lower doors together to allow the upper door to slide relative to the lower door when the upper unit is moved to the upper and lower positions.

The invention also comprises roller means coupled to the bottom side of the bottom of the lower unit. Support means is provided for supporting said roller means in a first position extending beyond said bottom side to allow said enclosure to roll on the bed of the vehicle for removal or for installation purposes and in a second position wherein said enclosure is incapable of rolling on the bed of the vehicle. Means coupled to said roller means is provided for moving said roller means to either of said first or second positions.

In a further aspect, a plurality of support means are secured to the bottom side of said bottom of said lower unit. Said plurality of support means are moved to first positions when the enclosure is supported on the bed of the vehicle and to second positions for supporting said enclosure when it is removed from the bed of the vehicle.

The invention in another aspect also comprises a flexible wind shield having first and second ends with said first end coupled to the outside and upper end of said front wall of the upper unit and magnetic means coupled to said second end for coupling said second end to the metal wall of the cab of the vehicle when the enclosure is supported on the bed of the vehicle.

BRIEF DESCRIPTION OF THE DRAWINGS

FIG. 5 is a partial cross-sectional view of the apparatus of the invention illustrating in more detail the side wall and top wall of the upper unit and some of the details of the components of the lifting and lowering mechanism of the upper unit.

FIG. 6 is a cross-sectional view of FIG. 5 taken along line 6—6 thereof.

FIG. 9 is a partial cross-sectional view of the door of FIG. 7 taken along a horizontal plane extending through both the upper and lower door members.

FIG. 11 is a partial cross-sectional view of the bottom of the lower unit illustrating a roller and a mechanism for moving the roller to a lower position for lifting the apparatus above the bed of the vehicle for removal or installation purposes.

FIG. 13 is a bottom view of the lower unit illustrating the rollers in a lower extended position for allowing the apparatus to be rolled onto or off of the bed of the vehicle.

FIG. 14 is a front view of the apparatus of the invention showing it removed from the vehicle and supported by four feet or posts which are attached to the bottom unit.

DESCRIPTION OF THE PREFERRED EMBODIMENTS

Referring now to FIGS. 1-6 of the drawings. There is illustrated a motor vehicle 21 which is a conventional pick up truck having a cab 23 and a rear bed 25 with side walls 27 and 29.

Figure 1:
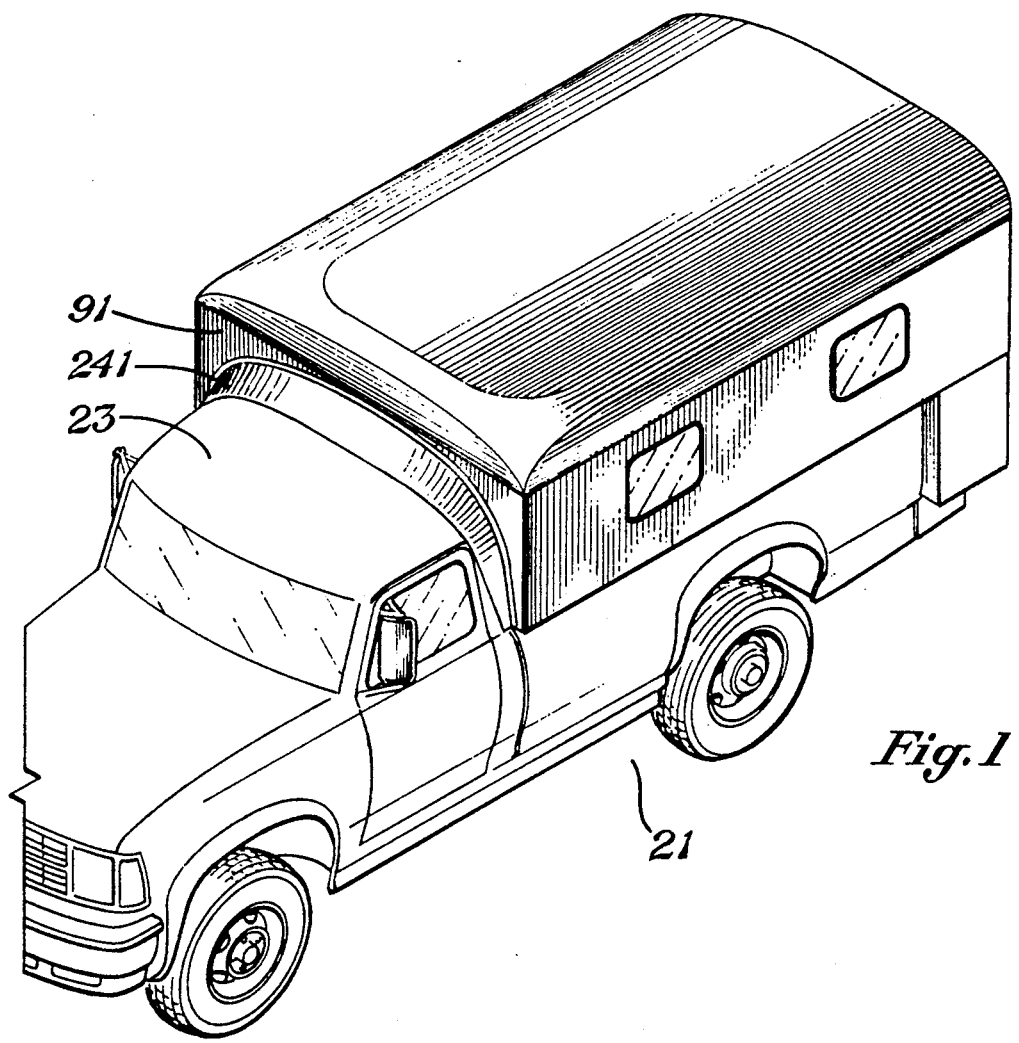
FIG. 1 is an isometric view of the apparatus of the invention installed on the bed of a pickup with the upper unit in a lower position.
Figure 2:
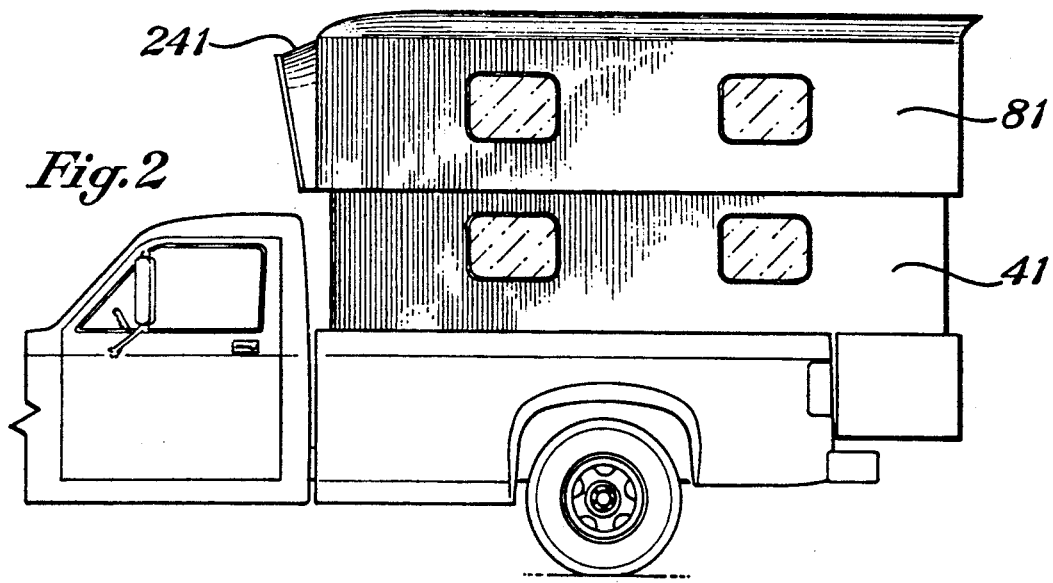
FIG. 2 is a side view of the apparatus of FIG. 1 with the upper unit in an upper position.

The apparatus of the invention comprises a lower structural unit 41 and an upper structural unit 81 which can be telescoped or moved to downward and upward positions relative to the lower unit 41 as shown in FIGS. 1 and 2 respectively. The lower unit 41 is adapted to be supported by the bed 25 and the upper edges 27E and 29E of the side walls 27 and 29 of the vehicle 21.

The lower unit 41 comprises a bottom 43 adapted to be supported by the bed 25. It has side walls 45 and 47 extending upward to ledges 49 and 51 which have their inner portions connected to the upper ends 45E and 47E of side walls 45 and 47. Upper side walls 53 and 55 have their lower ends connected to the outer portions of ledges 49 and 51 respectively The lower unit 41 has a rear wall 57L and 57U and a front wall 59L and 59U.

Ledges 49 and 51 are removably secured to the upper ends 27E and 29E of the vehicle by bolts 61.

The upper unit 81 comprises a top wall 83, two side walls 85 and 87, a rear wall 89 and a front wall 91.

Figure 3:
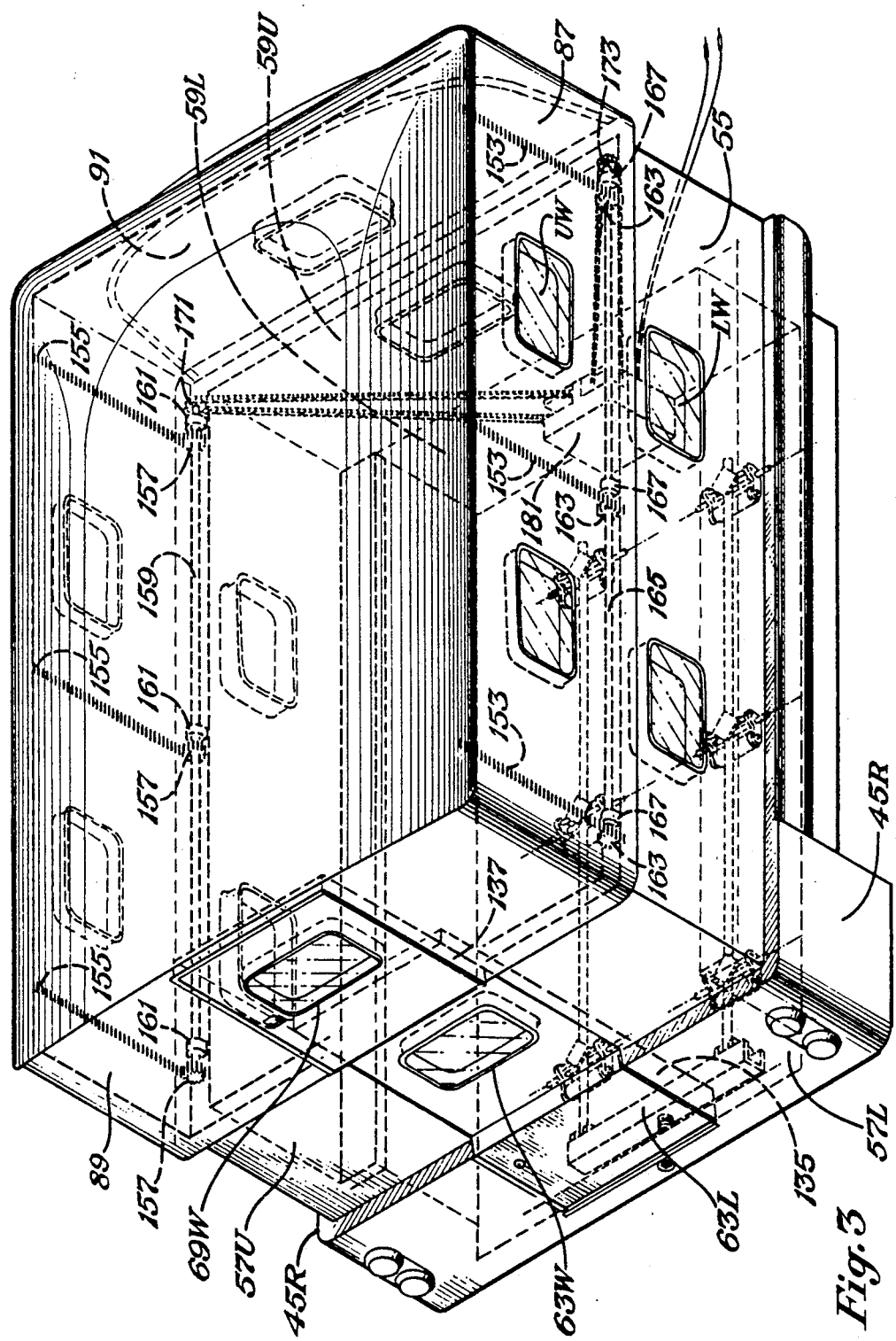
FIG. 3 is an isometric view of the apparatus of the invention illustrating the raising and lower mechanism of the upper unit and the rear door of the apparatus.
Figure 4:
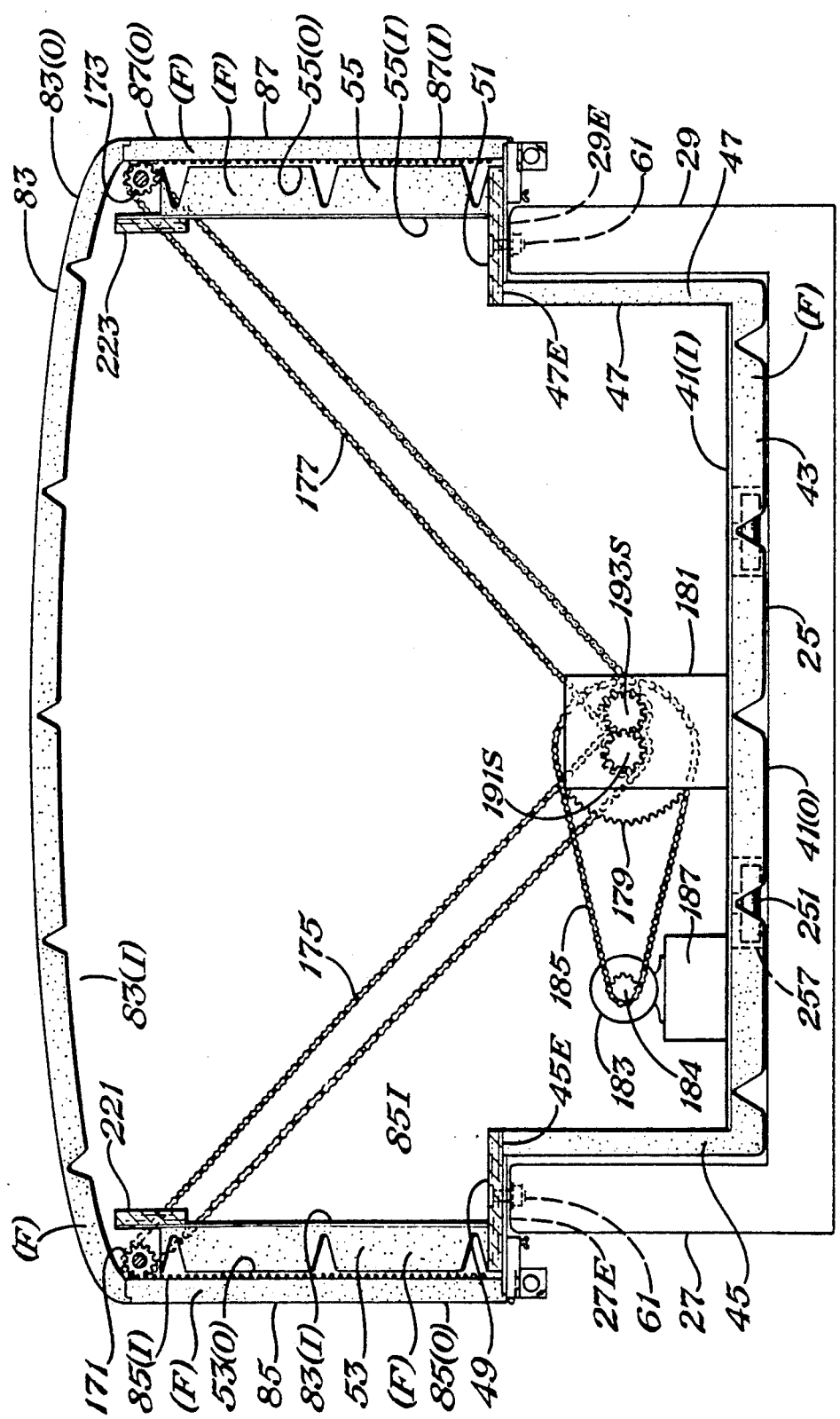
FIG. 4 is a cross-sectional view of the apparatus of FIG. 3 illustrating in more detail the lifting and lower mechanism for the upper unit.

The inside lateral dimensions of the walls 85, 87, 89, and 91 are greater than the outside lateral dimensions of walls 53, 55, 57, and 59 respectively such that the walls 85, 87, 89, and 91 of the upper unit 81 can fit around the walls 53, 55, 57, and 59 respectively with the top wall 83 in the upper position and be moved or telescoped to upper or lower positions as shown in FIGS. 3 and 4 respectively.

The rear walls 57L and 57U and 89 of lower and upper units 41 and 81 have door members 63 and 69 which are slidably coupled to each other for opening and closing door openings 65 and 95 formed in the rear walls 57 and 89 respectively. The door members 63 and 69 are pivotably coupled to the rear walls 57L and 57U and 89 for pivotal movement about the same axis 131 and 133 whereby the door members 63 and 69 swing together.

The lower and upper units 41 and 81 are made from molds designed for thermoforming plastic. The design uses techniques as ribbing, double wall fused together components (called stress skin) filled with structural foam and achieve exceptional strong, light weight, and good aerodynamics. The lower unit 41 comprising walls 43, 45, 47, 57L and 59L have inner plastic walls 41(I) and outer plastic walls 41(0) molded to fit the bed of a pickup or trailer which are secured together and filled with structural plastic foam (F). Side walls 53 and 55 also have inner walls 53(I) and 55(I) and outer walls 53(0) and 55(0) molded from plastic and secured together respectively and filled with structural plastic foam (F). Front and rear wall portions 57U and 59U also each have inner and outer walls molded from plastic and secured together respectively and filled with structural foam. Wall portions 57U and 59U are secured to wall portions 57L and 59L respectively. Wall portions 57L and 45R extend outward such that their outside surfaces are in the same planes as outside surfaces 89, 85 and 87 respectively. Ledges 49 and 51 are formed of wood or plastic and the tops of walls 45 and 47 are attached to the lower inner portions of ledges 49 and 51 and the bottoms of walls 53 and 55 are attached to the upper outer portions of ledges 49 and 51.

Top wall 83 is formed of inner and outer molded plastic walls 83(I) and 83(0) secured together and filled with structural plastic foam (F).

Walls 85, 87, 89 and 91 also are formed of inner molded plastic walls 85(I), 87(I), 89(I) and 91(I) and outer molded plastic walls 85(0), 87(0), 89(0) and 91(0) secured together respectively and filled with plastic foam (F). Wall 91(I) is not shown. Walls 85, 87, 89, and 91 are secured to the lower edges of top wall 83 with glue and/or mechanical fasteners.

The door members 63 and 69 are formed of inner molded plastic walls 63(I) and 69(I) and outer molded plastic walls 63(0) and 69(0) secured together respectively and filled with plastic foam (F).

In one embodiment, the plastic walls may be formed of A.B.S. Plastic and the plastic foam (F) may be formed of structural urethane.

Figures 7, 8:
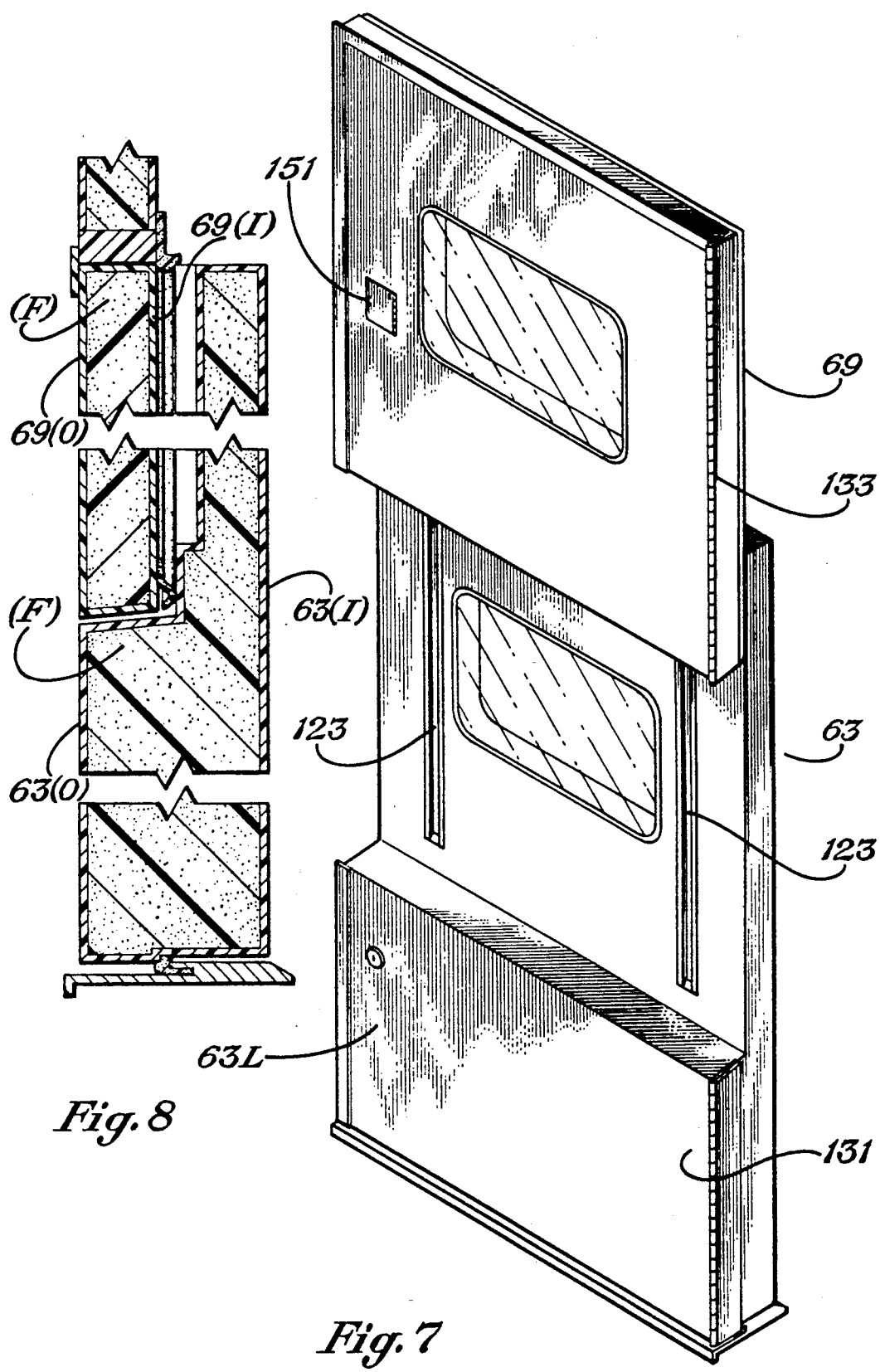
FIG. 7 is an isometric view of the upper door member and lower door member of the upper and lower units which together form a door for opening and closing the rear opening of the upper and lower units.
FIG. 8 is a partial cross-sectional view of the door of FIG. 7 taken along a vertical plane through the door of FIG. 7.
Figure 19:
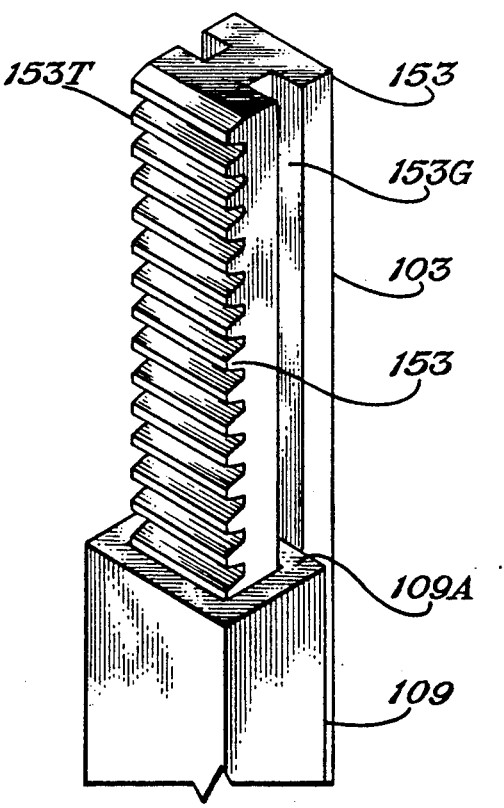
FIG. 19 illustrates a rack gear slidably coupled to a guide.

Tongue and groove mechanisms are coupled between walls 87 and 55 and 85 and 53 respectively to guide the unit 81 as it slides or moves between its upper and lower positions. One tongue and groove mechanism for walls 87 and 55 is shown in FIGS. 6 and 19. It comprises elongated member 153 and 103 secured together by bolts 105 with member 103 secured vertically to the inside of wall 87(0). An elongated aperture 107 is formed through wall 87(I) and through the foam (F) to receive the members 153 and 103. An elongated member 109 with a groove 111 is secured vertically to wall 55(0) to slidably receive the tongue member 153. Member 153 is a rack gear having grooves 153G into which the arms 109A are slidably located. This structure will control the space between the upper and lower units and further it keeps the rack and spur gears (to be described subsequently) in proper mesh. The teeth of rack gear 153 are shown at 153T. In order not to interfere with the spur gears, the top of guide member 109 is located just below its associated spur gear. Each rack gear and its associated guide member 109 are constructed as shown in FIGS. 6 and 19. The rack gears are connected to the side walls 85 and 83 of the upper unit 81 and the guide members 109 are connected to walls 53 and 55 of the lower unit 41. Slidable tongue and groove structure (for example similar to that used between the door members as shown in FIGS. 7 and 9) also will be coupled to the rear walls 57U and 89 on both sides of the door and to the front walls 91 and 59U. This structure prevents lateral movement between the upper and lower units which may be otherwise caused by wind pressure when traveling.

Lower and upper windows LW and UW are formed through the front and side walls of units 41 and 81 such that the upper windows UW will be in alignment with their associated lower windows when the upper unit 81 is in its lower position.

Upper and lower door members 69 and 63 also have tongue and groove mechanisms for slidably coupling door members 69 and 63 together and for guiding the upper door member 69 when it is moved with the upper unit between the upper and lower positions Referring to FIGS. 7 and 9, the tongues 121 are elongated members secured vertically to the inside wall 69(I) of door member 69. The grooves 123 are formed in elongated members 125 vertically secured in slots 127 formed in the outside wall 63(0) of door member 63. The grooves 123 slidably receive the tongue 121.

Door member 63 has a lower portion 63L which extends outward such that its outside surface is in the same plane as the wall 57L at the rear. Elongated hinges 131 and 133 are connected to the outer edges of the door members 63L and 69 and to the outer edges of the jams 135 and 137 of the door openings 65 and 95 formed in the rear walls 57L and 57U and 89 for allowing the door members 63 and 69 to swing together to open and closed positions. Hinges 131 and 133 extend along the same vertical axis. Windows 63W and 69W are formed in the door members 63 and 69 such they will be in alignment with each other when the upper unit 81 is in the lower position.

A handle 141 is provided in door member 63 for allowing a person to open the door 63, 69 from the inside. Operation of the handle 141 moves a key member 143 inward and outward of a slot 145 formed in jam 147. In addition, a small door 151 is provided in the outside of door member 69 to allow a person to operate the handle 141 from the outside. A pull-out recessed handle 141(H) pivotally coupled to handle 141 at 141(P) in recess 141(R) also can be operated to move key member 143 to open the door when the small door 151 is opened. A lock can be provided for locking the small door 151 in its closed position.

A gear mechanism and a drive system are provided to move the upper unit 81 to its upper and lower positions and to hold and support the upper unit in its upper position. Referring to FIGS. 3, 4, and 5, the gear mechanism comprises three rack gears 153 secured vertically to the inside of wall 85 and three rack gears 155 secured vertically to the inside of wall 87. The rack gears and their guides 109 were discussed previously. Three spur gears 157 are secured to a rotatable shaft 159 for meshing with the three rack gears 155 respectively. Shaft 159 is mounted for rotation by bearings 161 secured to the top portion of wall 53. In addition three spur gears 163 are secured to a rotatable shaft 165 for meshing with the three rack gears 155. The shaft 165 is mounted for rotation by bearings 167 secured to the top portion of wall 55.

Figure 18:
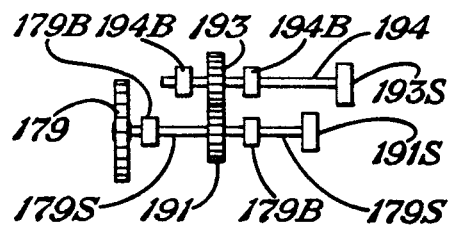
FIG. 18 schematically illustrates a part of the gear system for raising and lowering the upper unit.

End sprockets 171 and 173 are fixedly secured to the ends of shafts 159 and 165 near the front end of the enclosure around which extends two endless roller chains 175 and 177 respectively. A large gear 179 is rotatably supported by a support 181 which is secured to the bottom of unit 41 near the front of the enclosure. The gear 179 can be rotated in either direction by a reversible DC motor 183, which has a sprocket 184 attached to its driving shaft and an endless roller chain 185. Motor 183 is secured to a support 187 which is secured to the bottom of the unit 41 near the front of the enclosure. A smaller gear 191 is secured on the shaft 179S of gear 179 for rotation therewith. (See also FIG. 18) Bearings 179B connected to support 187 support the shaft 179S for rotation. A smaller gear 193 is also secured to a shaft 194 which is supported for rotation by bearings 194B which are mounted to the support 181. Gear 193 meshes with gear 191. Rotation of gear 191 rotates gear 193. Sprockets 191S and 193S are secured to shafts 179S and 194 respectively for rotation therewith. Roller chain 175 extends around sprocket 191S and roller chain 177 extends around sprocket 193S. Rotation of the motor 183 in one direction drives the gears 179 and 191 and gear 193 in directions to move roller chains 175 and 177 in directions to rotate the sprockets 171 and 173 in directions to move the unit 81 upward from its lower position. Rotation of motor 183 in an opposite direction drives gears 179 and 191 and gear 193 in directions to move sprocket chains 175 and 177 in directions to rotate sprockets 171 and 173 in directions to move the unit 81 downward from its upper position.

Figure 17:
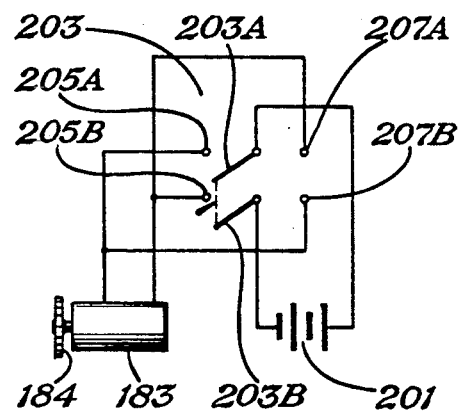
FIG. 17 is an electrical schematic of the circuit for operating the electric motor of the raising and lowering mechanism of the upper unit.

The motor 183 can be operated from the 12 volt DC battery of the motor vehicle with the switching system located in the cab 23. In FIG. 17 the DC battery is shown at 201. A switch 203 having two poles 203A and 203B is connected to the plus and minus sides of the battery 201. The poles 203A and 203B are movable together for contacting either terminals 205A and 205B or terminals 207A and 207B for connecting the battery 201 to the motor 183 for rotating the motor in either one direction or in an opposite direction. During the raising or lowering operation, the operator can control the switch visually and can move the switch to a neutral position when the desired upper or lower positions of the upper unit 41 is reached. Limit switches also can be provided, if desired, to terminate power automatically to the motor 183 when the desired upper and lower positions of the upper unit 81 are reached. The DC motor 183 is a winch type motor and will hold a load under pull when stopped in which ever position it happens to be. As a safety precaution, a manually controllable positive mechanical stop will be installed to hold the upper unit 81 in its upper position when the enclosure is occupied. The motor drive unit can be rotated manually with the use of a crank in case of power failure.

As shown in FIG. 4, shields 221 and 223 are connected to the walls 53 and 55 to hide the gears 161, 163 and shafts 159 and 165. A wall also may be provided near the front of the enclosure for hiding the motor 183, gears 179, 191 and 193 and roller chains 175 and 177. In addition, expandable and contractible bellows 225 (See FIG. 5) are secured to the tops of walls 53 and 55 and to wall 83(I) to hide the rack gears 153 and 155 when the unit 81 is moved to the upper position.

Thus an effective and easy to operate system is provided to move the unit 81 to its upper and lower positions relative to the unit 41. In the upper position, an attractive enclosure is provided for persons who can easily enter and leave by way of the door 63 and 69. When it is desired to drive the vehicle on the road, the unit 81 will be moved to its lower position. In the lower position of the unit 81, there is a minimum of air resistance encountered while the vehicle is moving on the road. The air resistance also is minimized further by use of a shield 241. The shield 241 comprises a U-shaped member formed of flexible plastic material having one end 243 secured to the front wall 91 of the upper unit 81 as shown in FIGS. 1, 2, 10 and 14, and a second end 245 to which magnetic material 247 is secured causing end 245 to maintain firm contact to the metal wall of the top and rear sides of the cab 23 when the unit 81 is in its lower position. In this lower position, the shape of the shield 241 will deflect the air upward and outward while the vehicle is traveling thereby minimizing air resistance. The magnetic material 247 may be commercially available bendable strips or magnetic tape. With the use of the magnetic material 247, the end 245 of the shield 241 readily releases from the cab 23, when the unit 81 is raised.

Referring to FIGS. 4 and 11-16, rollers 251 and legs or posts 301 are provided for readily allowing the enclosure to be rolled off of or onto the bed of the vehicle and for supporting the enclosure on the ground while it is off of the vehicle 21 freeing the vehicle 21 for other use.

Figure 12:
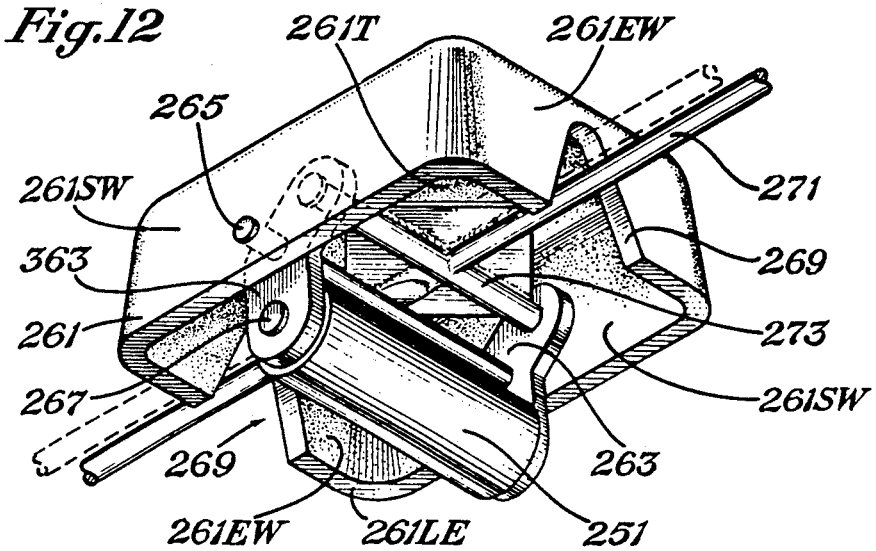
FIG. 12 illustrates structure used to, support one of the rollers in the bottom of the lower unit.

As shown in FIGS. 4, 13 and 14 two elongated slots 253 are formed in the underside of the bottom 43 of the lower unit 41 each of which leads to three cavities 257. As shown in FIG. 11, a wooden bottom member 259 may be attached to the bottom 41(I) of unit 41 for support purposes and slots 253 and cavities 257 molded in wall 41(0) during the molding process. Secured in each cavity 257 is a metal cup shaped member 261 having arms 263 pivotally coupled therein by a pivot pin 265 which extends through the side walls 261SW (See FIG. 12). The member 261 may be secured in the cavity of the bottom of unit 41 by screws inserted through apertures (not shown) formed through the top 261T and secured to the bottom of unit 41. The bottom edge 261LE will be flush with the bottom surface of the unit 41. A roller 251 is pivotally coupled to the other ends of the arms 263 by way of a pin 267. The rollers 251 can be pivoted to a lower extended position below the bottom of the unit as shown in FIGS. 12 or 13 for rolling the enclosure on the bed or to a retracted position within the cup 261 above the lower edge 261LE as shown in FIGS. 4 and 11. Slots 269 are formed in end walls 261EW of the cup 261 for receiving a rod 271 located in the slots 253. The rod is connected to a pin 273 which is pivotally coupled to the inside ends of arms 263. Movement of the rod 271 to the left as shown in FIG. 12 will pivot the roller 251 to the retracted position shown in FIG. 11. Movement of the rod 271 to the right as shown in FIG. 11 will pivot the roller to the downward extended position as shown in FIG. 12.

Each rod will be connected to the rod 273 of three cups 261 for controlling their rollers 251. The two rods extend in the two slots and have their rearward ends connected to a transverse bar 281 located for forward and rearward movement in a rear slot 283 formed in the bottom of unit 41. A threaded rod 285 is threaded through an aperture formed through angle iron 287 which is secured in the slot 283 to the bottom of unit 41. One end 285F of the rod 285 is coupled to the bar 281 and the other end 285R has a square head 289 which may be rotated by a wrench to move the rod 285 and hence the rods 271 forward for retracting the rollers 251 or rearward for extending the rollers downward thereby lifting the enclosure upward and supporting the enclosure on the bed of the vehicle whereby it may be rolled off or onto the bed of the vehicle. Bolts 61 (see FIG. 4) will be removed before the enclosure is lifted by the rollers 251.

Figure 16:
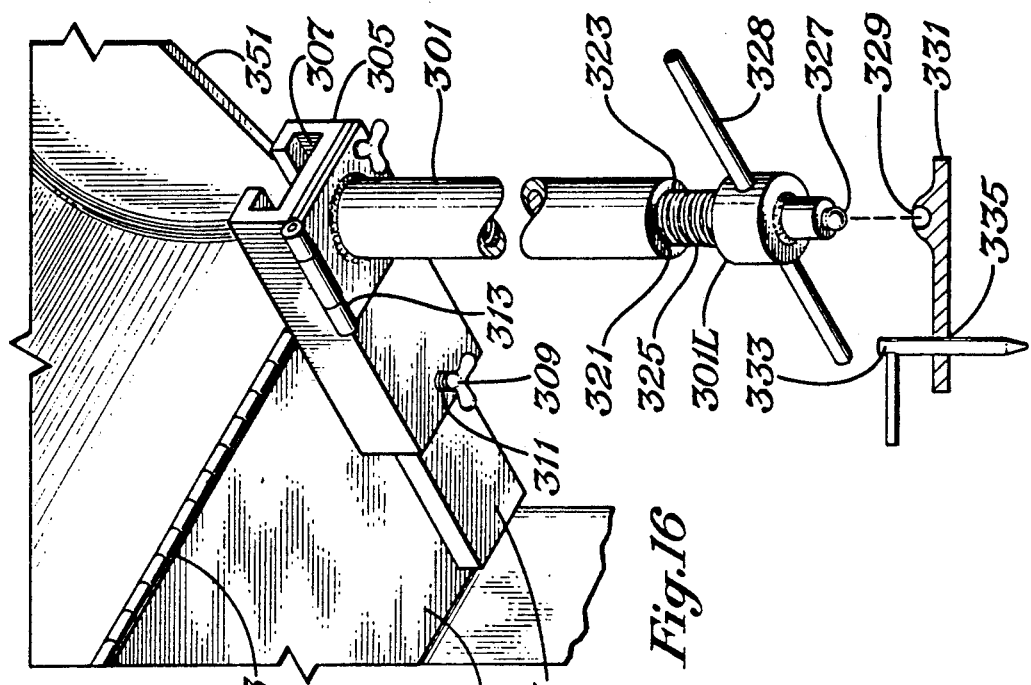
FIG. 16 illustrates one of the feet or post of FIGS. 14 and 15 located in its downward and supporting position.
Figure 15:
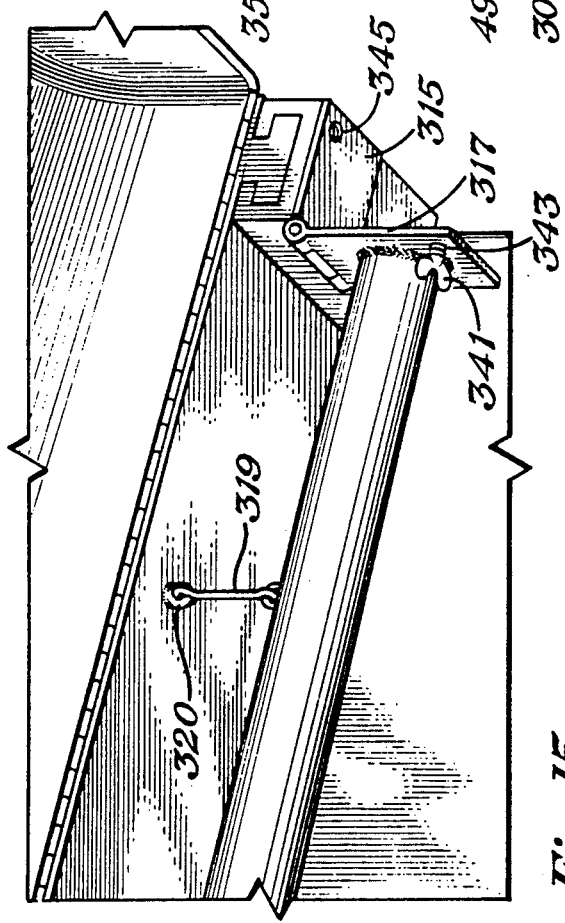
FIG. 15 illustrates one of the support post or feet of the invention in its folded and stored away position.
Figure 10:
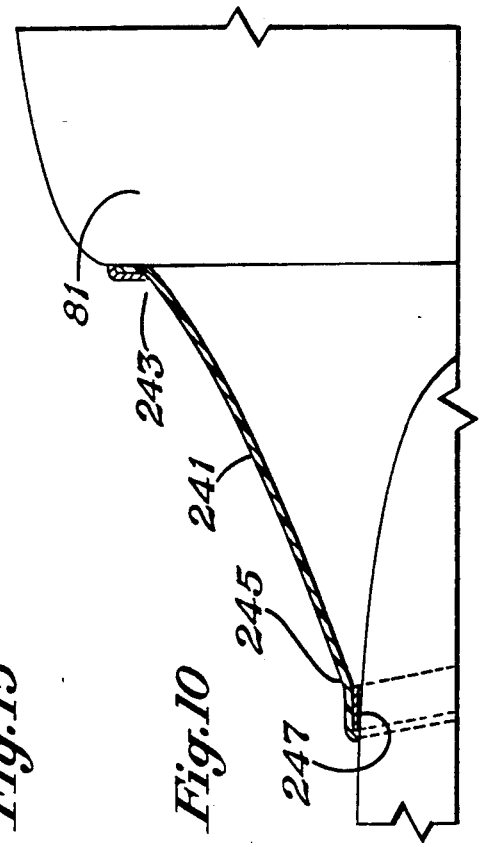
FIG. 10 is a cross-sectional view of the wind shield of the invention.

Referring to FIGS. 14-16 two of the legs 301 are slidably and pivotally coupled to the underside of ledge 49 of the lower unit 41 at the front and back and two of the legs 301 are slidably and pivotally coupled to the underside of the ledge 51 of the lower unit 41. Referring to FIGS. 15 and 16, the manner of connection of one of the legs 301 to the rear of ledge 49 will be described. The other three legs 301 will be connected to the lower unit in a similar manner. A tongue member 303 is connected to the under side of ledge 49 such that it extends laterally outward. Member 305 having a groove 307 slidably receives the tongue member 303. Member 305 may be slid between inner and outer positions as shown in FIGS. 15 and 16. A set screw 309 is screwed into a threaded aperture 311 extending through the bottom of member 305 to secure the member 307 to the tongue member 303 in either the inner or outer positions of the member 305. A hinge has one plate 315 secured to the outer end of the bottom of member 305. The top end of the leg 301 is attached to the other plate 317 of the hinge. In the retracted position of the leg 301, the member 305 will be moved to its inner position and the leg 301 extended and held in a forward position by a hook 319 attached to the ledge 49 and an eye 320 attached to the leg 301. In order to move the leg 301 to its supporting position, the hook 319 will be released from the eye 321, set screw 309 loosened, and leg 301 slid to the outward position and the set screw 309 tightened against the tongue 303. The plate 317 will be moved against the plate 315 and a screw 341 screwed through a threaded aperture 343 formed through plate 317 will be screwed into a threaded aperture 345 formed into plate 315. The leg 301 then will be located in a vertical position. A threaded aperture 321 extends into the leg 301 from end 323 and a lower portion 301L of the leg 301 has a threaded shaft 325 which is screwed into aperture 321. The lower portion 301L can be rotated in either direction to lengthen or shorten the leg 301 so that it extends to the ground to support its end of the enclosure. Handle 328 is provided to facilitate rotation of lower end 301L. The lower end 301L has a ball 327 which receives a depression 329 of a pad 331 to provide better support for the leg. A nail 333 extending through aperture 335 can be driven into the ground to secure the leg 301 in place.

To load the enclosure with the rollers 251, the enclosure should be set up on a platform level with and adjacent to the bed of the vehicle. (The customer can easily build the platform of wood & plywood). The rollers 251 are first moved to their downward position and the enclosure is rolled onto the vehicle. The rollers then are retracted and the enclosure sets down on the vehicle bed. The procedure is reversed to move or unload back onto the platform.

The enclosure can be unloaded off the vehicle onto legs 301 independently of the rollers 251 if the enclosure has initially been loaded onto the vehicle bed. (i.e. the legs cannot be employed unless the enclosure is up at a sufficient height). However, once the enclosure has been placed on the vehicle (or otherwise raised) then the range of motion of the jack screws 301L allows sufficient movement for raising or lowering so the vehicle can be moved out or under the enclosure. In unloading onto the legs, the rollers 251 may be (although not required) moved to the downward position which raises the enclosure. This allows easier and quicker rotation of the jack screws (which are not yet under pressure) to firmly contact the ground surface. Once contact is established, then retracting the rollers will provide clearance for the vehicle to drive out. An important feature of the leg systems is that it slides outward providing good clearance for the vehicle to move in or out.

For streamlining purposes in order to minimize air resistance and for pleasing looks, covers 351 are coupled to the outer edges of the ledges 49 and 51 by hinges 353. When the legs 301 are in their retracted and folded positions as shown in FIG. 15, the covers 351 will be moved to and latched in their downward positions as shown in FIG. 5 to cover the legs 301. When the legs 301 are in their downward supporting positions the covers 351 will be moved to and latched in their upward positions as shown in FIG. 14. The covers 351 are not shown in FIGS. 1, 2, and 4.

The apparatus of the invention may also be supported by a trailer to be pulled by a motor vehicle.

The door 63, 69; the rollers 251 and the mechanism for extending and retracting the rollers 251; the legs 301 and the mechanism for moving them to retracted and supporting positions; and the wind shield 241 may be used on telescoping enclosures employing mechanisms different from that of FIGS. 3, 4, and 5 for moving the upper unit to its lower and upper positions.

I claim:

1. An apparatus for use on the bed of a vehicle, comprising:
    lower structure having a bottom to be supported by the bed of the vehicle, an upward extending front wall, two upward extending side walls, and an upward extending rear wall forming a space between said walls of said lower structure,
    upper structure having a top, a downward extending front wall, two downward extending side walls, and a downward extending rear wall forming a space between said walls of said upper structure,
    said two side walls and said front and rear walls of said upper structure being spaced from each other respectively by dimensions sufficient to allow said upper structure to fit around said walls of said lower structure,
    gear means for supporting said walls of said upper structure around said walls of said lower structure and for use for moving said upper structure to upper and lower positions relative to said lower structure,
    said gear means comprising rack gear means coupled to the inside of each of said two side walls of said upper structure and rotatable gear means supported by each of said two side walls of said lower structure which mesh with said rack gear means such that rotation of said rotatable gear means of said two side walls of said lower structure in first opposite directions moves said upper structure to said upper position and rotation of said rotatable gear means of said two side walls of said lower structure in second opposite directions moves said upper structure to said lower position, and
    drive means for rotating said rotatable gear means supported by said two side walls of said lower structure in either of said first or second opposite directions.

2. The apparatus of claim 1, wherein:
    said two downward extending side walls of said upper structure have a given height dimension,
    said rack gear means comprises at least two rack gears secured to the inside of each of said side walls of said upper structure near said front and rear walls respectively and which extend along said given height dimension such that the inside of each of said side walls of said upper structure has a rack gear secured thereto near said front wall and which extends along said given height dimension and a rack gear secured thereto near said rear wall and which extends along said given height dimension;
    said rack gears having dimensions such that they extend along a substantial portion of said given height dimension of said side walls of said upper structure,
    each of said side walls of said lower structure being adjacent to a side wall of said upper structure,
    said rotatable gears means comprises a pair of rotatable gears supported at upper locations of each of said side walls of said lower structure to mesh respectively with said two rack gears of the adjacent side wall of said upper structure,
    shaft means connected to each of said pairs of rotatable gears such that each pair of rotatable gears rotate together, and
    drive means supported by said lower structure near said front wall for driving said pairs of rotatable gears together.

3. The apparatus of claim 2, wherein:
    said shaft means comprises two shafts, each of which is connected separately to a pair of said pairs of rotatable gears,
    said drive means comprises:
    two drive gear means, an electrical drive motor for rotating said two drive gear means in opposite directions and two chain means coupled to said two drive gear means and to said two shafts respectively for rotating said pairs of rotatable gears together in opposite directions;
    said drive means being substantially located within said space of said lower structure.

4. The apparatus of claim 1, comprising:
    upper and lower door openings formed in said rear walls of said upper and lower structures in alignment with each other,
    upper and lower door members pivotally coupled to said rear walls of said upper and lower structures respectively for pivotal movement about aligned axes for opening and closing said upper and lower door openings respectively, means for slidably coupling said upper and lower doors together to allow said upper door to slide relative to said lower door when said upper structure is moved to said upper and lower positions.

5. The apparatus of claim 1, wherein:

said bottom of said lower structure has a bottom side, a plurality of roller means coupled to the bottom side of said bottom of said lower structure, support means for supporting said plurality of roller means in a first position extending beyond said bottom side of said bottom to allow said apparatus to roll on the bed of the vehicle for removal or for installation purposes and in a second position where said apparatus is incapable of rolling on the bed of the vehicle, said plurality of roller means being located to completely support said bottom of said lower structure off of the bed of the vehicle when said plurality of roller means are in said first position, and means coupled to said plurality of roller means for moving said plurality of roller means to either of said first or second positions.

6. The apparatus of claim 5, comprising:

a plurality of support devices secured to said lower structure, each of said plurality of support devices being movable to a storage position when said apparatus is supported on the bed of the vehicle for storage purposes and to a supporting position for supporting said apparatus when said apparatus is removed from the bed of the vehicle.

7. The apparatus of claim 1, wherein:

said front wall of said upper structure has an outside upper end, said vehicle has a cab with a metal wall, a wind shield formed of flexible material and having first and second ends with said first end coupled to said outside upper end of said front wall of said upper structure and magnetic means coupled to said second end for removably coupling said second end to said metal wall of said cab of said vehicle when said lower structure is supported on the bed of said vehicle and said upper structure is moved to said lower position.

8. The apparatus of claim 1, comprising:

guide means coupled to said side walls of said lower structure and to said rack gear means for slidably holding said rack gear means as said upper structure is moved to its upper and lower positions.

9. The apparatus of claim 2, comprising:

upper and lower door openings formed in said rear walls of said upper and lower structures in alignment with each other, upper and lower door members pivotally coupled to said rear walls of said upper and lower structures respectively for pivotal movement about aligned axes for opening and closing said upper and lower door openings respectively, means for slidably coupling said upper and lower doors together for allowing said upper door to slide relative to said lower door when said upper structure is moved to said upper and lower positions.

10. An apparatus for use on the bed of a vehicle comprising:

lower structure having a bottom to be supported by the bed of the vehicle, an upward extending front wall, two upward extending side walls, and an upward extending rear wall forming a space between said walls of said lower structure, upper structure having a top, a downward extending front wall, two downward extending side walls, and a downward extending rear wall forming a space between said walls of said upper structure, said two side walls and said front and rear walls of said upper structure being spaced from each other respectively by dimensions sufficient to allow said upper structure to fit around said walls of said lower structure, means for supporting said walls of said upper structure around said walls of said lower structure and for moving said upper structure to upper and lower positions relative to said lower structure, said bottom of said lower structure has a bottom side, a plurality of roller means coupled to the bottom side of said bottom of said lower structure, support means for supporting said plurality of roller means in a first position extending beyond said bottom side of said bottom to allow said apparatus to roll on the bed of the vehicle for removal or for installation purposes and in a second position where said apparatus is incapable of rolling on the bed of the vehicle, said plurality of roller means being located to completely support said bottom of said lower structure off of the bed of the vehicle when said plurality of roller means are in said first position, and means coupled to said plurality of roller means for moving said plurality of roller means to either of said first or second positions.

11. The apparatus of claim 10, comprising:

a plurality of support secured to said lower structure, each of said plurality of support deices being movable to a storage position when said apparatus is supported on the bed of the vehicle for storage purposes and to a supporting position for supporting said apparatus when said apparatus is removed from the bed of the vehicle.

12. The apparatus of claim 2, comprising:

guide means coupled to said side walls of said lower structure and to said rack gear means for slidably holding said rack gear means as said upper structure is moved to its upper and lower positions.

13. The apparatus of claim 2, wherein:

said bottom of said lower structure has a bottom side, a plurality of roller means coupled to the bottom side of said bottom of said lower structure, support means for supporting said plurality of roller means in a first position extending beyond said bottom side of said bottom to allow said apparatus to roll on the bed of the vehicle for removal or for installation purposes and in a second position where said apparatus is incapable of rolling on the bed of the vehicle, said plurality of roller means being located to completely support said bottom of said lower structure off of the bed of the vehicle when said plurality of roller means are in said first position, and means coupled to said plurality of roller means for moving said plurality of roller means to either of said first or second positions.

14. The apparatus of claim 13, comprising:

a plurality of support devices secured to said lower structure, each of said plurality of support devices being movable to a storage position when said apparatus is supported on the bed of the vehicle for storage purposes and to a supporting position for supporting said apparatus when said apparatus is removed from the bed of the vehicle.

15. The apparatus of claim 2, comprising:

means coupled to the inside of said side walls of said lower structure for concealing said rack gears, said rotatable gears, and said shaft means.

16. The apparatus of claim 2, comprising:

a plurality of support devices secured to said lower structure, each of said plurality of support devices being movable to a storage position when said apparatus is supported on the bed of the vehicle for storage purposes and to a supporting position for supporting said apparatus when said apparatus is removed from the bed of the vehicle.

17. The apparatus of claim 15, comprising:

a plurality of support devices secured to said lower structure, each of said plurality of support devices being movable to a storage position when said apparatus is supported on the bed of the vehicle for storage purposes and to a supporting position for supporting said apparatus when said apparatus is removed from the bed of the vehicle.

* * * * *